US010272637B2

(12) United States Patent
Bolsee

(10) Patent No.: US 10,272,637 B2
(45) Date of Patent: Apr. 30, 2019

(54) PREFORM DRAPING FOR A COMPOSITE COMPRESSOR CASING OF AN AXIAL TURBINE ENGINE

(71) Applicant: Techspace Aero S.A., Herstal (Milmort) (BE)

(72) Inventor: Hughes Bolsee, Verviers (BE)

(73) Assignee: Safran Aero Boosters SA (BE)

( * ) Notice: Subject to any disclaimer, the term of this patent is extended or adjusted under 35 U.S.C. 154(b) by 471 days.

(21) Appl. No.: 15/092,217

(22) Filed: Apr. 6, 2016

(65) Prior Publication Data

US 2016/0297171 A1 Oct. 13, 2016

(30) Foreign Application Priority Data

Apr. 7, 2015 (BE) .................................. 2015/5222

(51) Int. Cl.
| | |
|---|---|
| B29C 31/08 | (2006.01) |
| B32B 5/02 | (2006.01) |
| B32B 37/14 | (2006.01) |
| F04D 29/52 | (2006.01) |
| F04D 29/02 | (2006.01) |
| B32B 3/10 | (2006.01) |
| B29B 11/16 | (2006.01) |

(52) U.S. Cl.
CPC ............... *B32B 5/02* (2013.01); *B29B 11/16* (2013.01); *B29C 31/085* (2013.01); *B32B 3/10* (2013.01); *B32B 37/14* (2013.01); *F04D 29/023* (2013.01); *F04D 29/522* (2013.01); *B32B 2603/00* (2013.01); *Y10T 428/24802* (2015.01)

(58) Field of Classification Search
None
See application file for complete search history.

(56) References Cited

FOREIGN PATENT DOCUMENTS

| | | |
|---|---|---|
| EP | 0470901 A1 | 2/1992 |
| EP | 1777063 A1 | 4/2007 |
| FR | 2985928 A1 | 7/2013 |

(Continued)

OTHER PUBLICATIONS

European Search Report from corresponding Belgium Application No. BE 201505222, dated Dec. 3, 2015.

(Continued)

*Primary Examiner* — Gerard Higgins
(74) *Attorney, Agent, or Firm* — Sandberg Phoenix & von Gontard P.C.

(57) ABSTRACT

The present disclosure provides an iterative method for draping fiber plies to produce a preform for a composite wall with an organic matrix. The method comprises the sequential stacking of woven fiber plies on a template. The plies are covered with reference markings, particularly with tracer threads forming a grid pattern, the positions of the threads being indicated by means of illuminated marks projected by a laser. The reference markings of the plies are moved in turn until they coincide with their corresponding marks, thereby ensuring the correct positioning of the corresponding ply. The stack contains plies with threads orientated at −45°/+45° and at 0°/90°. The illuminated marks change with each type of ply so as to project dedicated indications onto the plies. The present disclosure also provides a draping installation and a composite wall of a casing of an axial turbine engine, or of a motor vehicle structure.

12 Claims, 5 Drawing Sheets

(56) References Cited

FOREIGN PATENT DOCUMENTS

FR            2995553 A1     3/2014

OTHER PUBLICATIONS

F.C. Campbell; "Ply collation: A major cost driver", "Manufacturing processes for advanced composites", 2004, Elsevier, Oxford, UK, XP002535222; ISBN: 1-8561-7415-8, pp. 131-173, p. 141-144, figures 10,11,14,30, and pp. 163-171.
Plivier Guillermin Ed—Miracle & S L Donaldson DB; "Computer-Aided Design and Manufacturing", "Computer Aided Design"; 2001; Composites, IPC Business Press Ltd.; Haywards Heath, GB, pp. 366-372, XP-002628834, ISSN: 0010-4361, p. 367, col. 1, p. 371, col. 3, p. 372, col. 1.

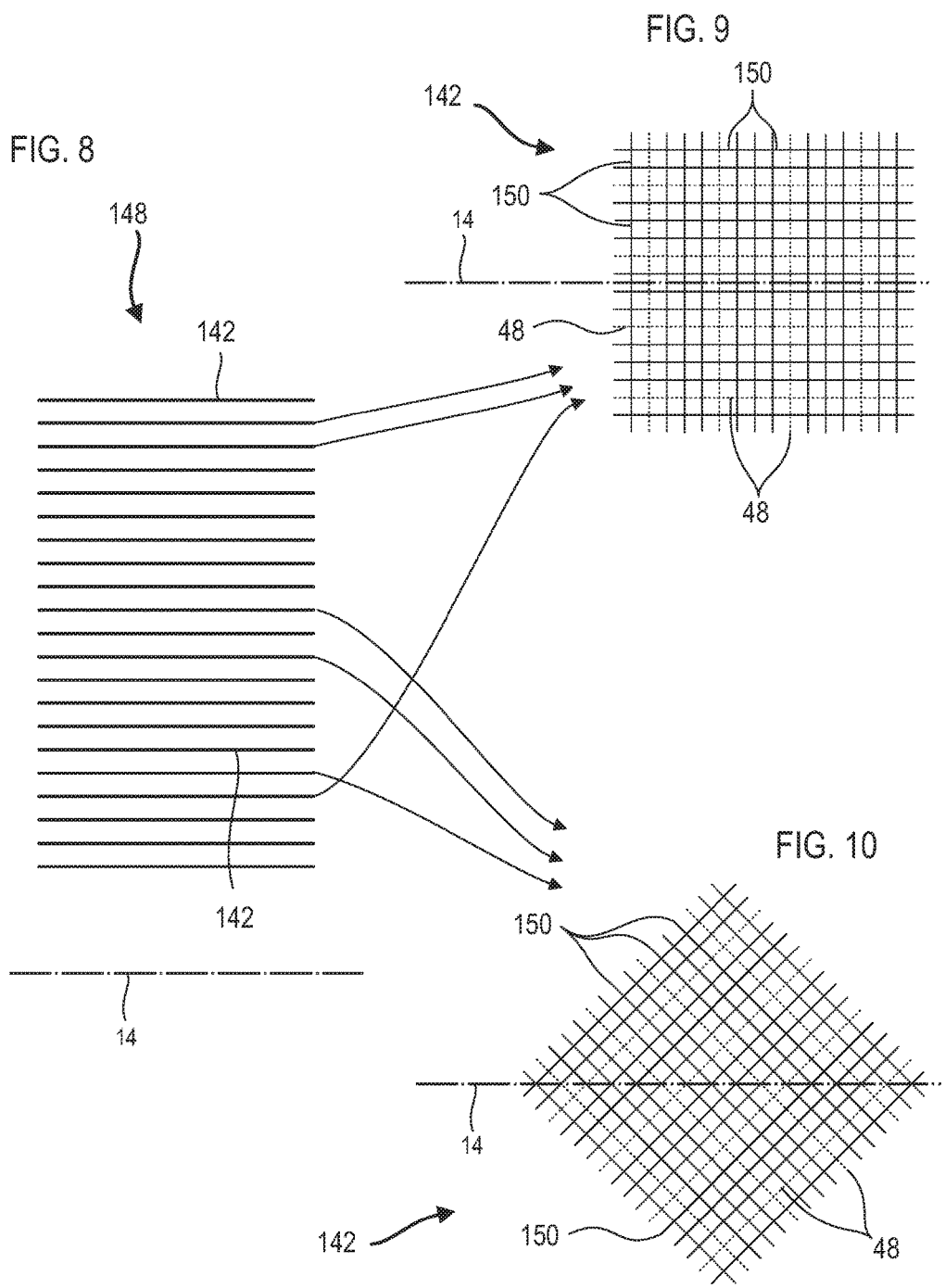

PREFORM DRAPING FOR A COMPOSITE COMPRESSOR CASING OF AN AXIAL TURBINE ENGINE

CROSS-REFERENCE TO RELATED APPLICATIONS

This application claims the benefit, under 35 U.S.C. § 119, of BE 2015/5222 filed Apr. 7, 2015, the disclosure of which is incorporated herein by reference in its entirety.

FIELD

The invention relates to preforms for composite walls. More precisely, the invention relates to a method for draping the fiber plies of a fiber preform for a composite wall. The invention also relates to a turbine engine comprising a casing with a composite wall. The invention also relates to an installation for draping the fiber plies of a preform for a composite wall.

BACKGROUND

The field of transport uses composite materials in order to benefit from their lightness while ensuring optimal mechanical strength. Some composite materials include an organic matrix reinforced by a fiber preform. The latter can include a stack of fiber plies woven together using interlacing threads.

The mechanical strength provided by a composite of this type can be estimated by means of software. This theoretical strength is based on a predetermined model of thread orientation. In reality, the threads exhibit positioning errors, due for example to imprecise positioning of the plies, and safety factors are therefore required. These factors are integrated into the mechanical strength calculations in order to reduce the expected strength, with the result that the corresponding composite component has to be overdesigned.

In the case of a composite wall, the effect is to increase its thickness. This solution is unsatisfactory, particularly in the field of aeronautics, because it also increases the payload and has a direct effect on fuel consumption. The compactness is reduced, while safety is not necessarily ensured.

The document FR 2 995 553 A1 discloses a method for making a preform for a fan retention casing of a gas turbine designed for aeronautical use. The method comprises the winding of a fibrous structure onto a winding mandrel. The fibrous structure comprises tracing threads that enable the alignment of the structure to be monitored in real time by means of a camera. The real-time analysis can be used to invalidate a winding, preventing the subsequent use of a preform which is out of tolerance. However, this method requires the generation of rebuses, the proportion of which increases with the number of stacked fibrous layers, or the complexity of the shapes to be produced.

SUMMARY

The object of the invention is to resolve at least one of the problems posed by the prior art. More precisely, the object of the invention is to improve the mechanical strength of a composite wall. Another object of the invention is to improve the precision of the positioning and orientation of fiber plies in a fiber preform.

The invention relates to an iterative method for stacking fiber plies for making a reinforcing preform of a composite wall, the method comprising a step of: (a) adding a fiber ply to a preceding ply or to a stacking template, the added fiber ply having reference markings distributed over its surface, including at least a first reference marking and a second reference marking. In various embodiments, the method further comprises the steps of: (b) projecting at least two illuminated marks onto the added ply, including a first mark and a second mark, the marks being adapted to trace on the ply the predetermined positions to be occupied by corresponding reference markings in the preform; (c) moving the added ply relative to the illuminated marks so that the first reference marking coincides with the corresponding first mark; and (d) adjusting the added ply so that the second reference marking coincides with the corresponding second mark, the above steps being repeated so as to form a stack of fiber plies creating the preform.

According to various advantageous embodiments of the invention, the adjustment step (d) comprises a deformation of the added ply, such as stretching or shrinking, so that the second reference marking coincides with the second mark.

According to various advantageous embodiments of the invention, the adjustment step (d) comprises a rotation of at least a portion of the added ply around the first mark.

According to various advantageous embodiments of the invention, at the end of step (c) of moving the added ply, the method comprises the positioning of a wedge for locking the added ply, the wedge being applied against the first reference marking.

According to various advantageous embodiments of the invention, the projection step (b) comprises the projection of at least three illuminated marks onto the added ply, including a third illuminated mark, the adjustment step (d) comprising the movement and/or rotation and/or deformation, in various implementations in a localized way, of the added ply, so that the third mark coincides with a third reference marking on the ply. In various embodiments, the three illuminated marks define the vertices of a triangle.

According to various advantageous embodiments of the invention, the projection step (b) comprises the projection of at least N illuminated marks onto the added ply, the ply comprising at least N corresponding reference markings, the adjustment step (d) comprising the movement of a set of reference markings so that they coincide with their corresponding illuminated marks, the coincidence being established, for example in a progressive way, in order of proximity to the first reference marking.

According to various advantageous embodiments of the invention, at least one or each fiber ply is a ply woven with woven fibrous threads, in two generally perpendicular directions for example.

According to various advantageous embodiments of the invention, during the addition step (a) and/or during the adjustment step (d), the inclination of the woven threads varies, and/or some reference markings move towards or away from one another.

According to various advantageous embodiments of the invention, before the addition step (a), the ply is deformed so that perpendicular threads are moved towards one another angularly, while during the adjustment step (d) the same threads become perpendicular again, at least locally.

According to various advantageous embodiments of the invention, the plies are preformed so that they match the shape of the preform; in various instances the plies can be woven in a three-dimensional manner.

According to various advantageous embodiments of the invention, the reference markings comprise points, the illuminated marks being configured to indicate the positions of each of the points, and/or to form points.

According to various advantageous embodiments of the invention, the reference markings comprise polygons, such as triangles and/or quadrilaterals, the illuminated marks forming corresponding polygons.

According to various advantageous embodiments of the invention, the reference markings form an interlacing, and in various embodiments a grid pattern, the illuminated marks being configured to reproduce the interlacing, and in various embodiments the grid pattern.

According to various advantageous embodiments of the invention, the reference markings comprise tracer threads, for example tracer threads passing through the ply.

According to various advantageous embodiments of the invention, the reference markings comprise arcs, for example semi-circular arcs, which are concentric.

According to various advantageous embodiments of the invention, the reference markings comprise helical curves which have equal pitches and/or which sweep equal angles.

According to various advantageous embodiments of the invention, in the addition step (a) the added ply is positioned so as to be generally centred with respect to the template or with respect to the preceding ply.

According to various advantageous embodiments of the invention, in the thickness of the wall preform the reference markings of the plies form sets of reference markings, at least one or more set of reference markings or each set of reference markings comprising reference markings forming a stack of reference markings.

According to various advantageous embodiments of the invention, the preform comprises a central axis, the first mark being located on the central axis.

According to various advantageous embodiments of the invention, the preform is circular, or is an arc of a circle, with variations of radii and/or diameters, the first mark being located on the maximum radius and/or on the maximum diameter.

According to various advantageous embodiments of the invention, the preform has a main surface with an apex, the first mark being located on the apex.

According to various advantageous embodiments of the invention, the preform generally forms a tube or an angular portion of a tube, the preform comprising plies woven with perpendicular threads; the woven plies comprise threads arranged at 0° and 90° to the axis of the tube, and/or threads arranged at −45° and +45° to the axis of the tube.

According to various advantageous embodiments of the invention, during the stacking of the different superimposed plies, the first reference markings of at least two plies, for example of a plurality of plies, in various implementatins of each ply, are superimposed and/or coincide.

According to various advantageous embodiments of the invention, during the stacking of the different superimposed plies, the second reference markings of at least two plies, for example of a plurality of plies, in various implementations of each ply, are superimposed and/or coincide.

According to various advantageous embodiments of the invention, during the projection step (b), the illuminated marks are projected by means of at least one or in various embodiments a plurality of movable light sources such as lasers, whose beams are configured to sweep the surface of the added ply, in various implementations so as to reach each of its reference markings; the light sources can be controlled by a control unit.

According to various advantageous embodiments of the invention, the preform takes the general shape of a half-tube, and during the projection step (b) the illuminated marks are projected by means of two movable lasers placed on either side of the axis of the half-tube.

According to various advantageous embodiments of the invention, the reference markings are spaced apart from one another.

According to various advantageous embodiments of the invention, the reference markings are distributed over most of the ply, and can be distributed over most of the surface and/or most of the length and/or most of the width.

According to various advantageous embodiments of the invention, the reference markings are regularly distributed on the surface of the ply, and can form a regular pattern thereon.

According to various advantageous embodiments of the invention, the reference markings are distributed over the whole surface of the added ply, and/or of each ply in the stack.

According to various advantageous embodiments of the invention, the plies in the stack comprise fibers of the same kind(s).

According to various advantageous embodiments of the invention, the wall is curved, for example concave or convex; in various embodiments it can be a portion of a tube.

According to various advantageous embodiments of the invention, during the stacking of the different superimposed plies, the first reference markings of at least two plies, for example of a plurality of plies, which can be successive, are superimposed and/or coincide.

According to various advantageous embodiments of the invention, the stacking comprises at least two plies with identical woven plies, that can be successive plies. In various embodiments, the identical plies have the same thread orientations.

According to various advantageous embodiments of the invention, the added ply comprises at least four reference markings which define the vertices of at least one tetrahedron, for example a plurality of tetrahedra.

According to various advantageous embodiments of the invention, each reference marking corresponds to one illuminated mark, and vice versa.

According to various advantageous embodiments of the invention, the projection step (b) comprises the projection of at least N+M illuminated marks onto the added ply, said ply having at least N+M corresponding reference markings, N and M being positive integers, the adjustment step (d) comprising the adjustment of the ply so that the N-th reference marking coincides with the corresponding N-th illuminated mark, followed by the adjustment of the ply so that the N+M-th reference marking coincides with the corresponding N+M-th illuminated mark, the N-th reference marking being closer to the first reference marking than the N+M-th reference marking, and the N-th reference marking being placed between the first reference marking and the N+M-th reference marking.

According to various advantageous embodiments of the invention, at least one or each ply comprises at least six reference markings, e.g., at least ten reference markings, in various implementations at least twenty reference markings, and can be at least fifty reference markings.

According to various advantageous embodiments of the invention, the reference markings are spaced, in various instances regularly, at intervals of 1 to 100 cm, e.g., 5 to 25 cm, or e.g., from 10 to 15 cm.

According to various advantageous embodiments of the invention, the illuminated marks reproduce the shapes of the reference markings, notably the shapes that the reference markings must have when their ply has its predefined configuration.

According to various advantageous embodiments of the invention, the addition step (a) is a step of placing a fiber ply, and/or a step of covering the preceding ply or the template with a new covering ply.

The invention also relates to a composite wall, notably a wall of a composite casing of a low-pressure compressor of an axial turbine engine, the wall comprising an organic matrix and a fiber preform, the preform comprising a stack of fiber plies with reference markings distributed over their surfaces. In various embodiments, the wall further comprises an area where a reference marking of one ply coincides with a reference marking of another ply in the stack, for example with the reference markings of a plurality of other plies in the stack.

According to various advantageous embodiments of the invention, the wall comprises an area where a ply comprises a plurality of reference markings which coincide with reference markings of another ply in the stack, and in various instances with a plurality of sets of coincident reference markings of a plurality of other plies in the stack.

According to various advantageous embodiments of the invention, the coincident reference markings match one another, and/or are parallel, and/or form a stack, and/or form an alignment.

According to various advantageous embodiments of the invention, the wall comprises an edge with a composite fastening flange reinforced by the stack of plies, the reference markings forming parallel straight lines within the flange.

According to various advantageous embodiments of the invention, the fastening flanges are generally perpendicular to the wall, and the wall can comprise fastening holes.

According to various advantageous embodiments of the invention, the wall comprises fastening shafts, notably for stator blades, which pass through the preform.

According to various advantageous embodiments of the invention, the wall comprises at least one through fastening hole placed between two reference markings, and/or reference markings, e.g., those of each ply of the stack, surround at least one through fastening hole, or each through fastening hole.

The invention also relates to an axial turbine engine comprising a composite wall reinforced by a preform with a stack of plies. In various embodiments the preform is made according to various embodiments of the invention, and/or the wall is made according to various embodiments of the invention; the turbine engine can be a turbojet of an aircraft.

The invention also relates to an installation for stacking fiber plies, for making a fiber preform of a composite wall, e.g., of a composite casing of an axial turbine engine compressor, at least one fiber ply having reference markings distributed over its surface, the installation comprising: a template for stacking fiber plies and a light device projecting at least one light ray onto the template, and, in various embodiments, further comprising a control unit for the light device which is configured to control the light device so that it projects at least two illuminated marks onto each ply during its positioning, the marks being adapted to indicate the positions that the reference markings of the plies are to occupy in the preform.

According to various advantageous embodiments of the invention, the illuminated marks are adapted to the progressive variation of thickness of the preform during the stacking, in various instances to the progressive approach of the stack to the light device.

According to various advantageous embodiments of the invention, the light device comprises at least one, and in various instances at least two light sources, each light source can be a laser.

According to various advantageous embodiments of the invention, the stacking template comprises a tubular and/or convex surface, and can be flanges.

According to various advantageous embodiments of the invention, the stacking template comprises an axis along its principal elongation, and/or an axis of revolution, the two light sources being placed on either side of the axis, in various instances the two light sources can be arranged on a plane perpendicular to the axis.

According to various advantageous embodiments of the invention, the two light sources are arranged at 45° to the vertical direction from the template.

According to various advantageous embodiments of the invention, the template comprises a main stacking surface with an apex, and at least one illuminated mark is located on and/or centred on and/or coincides with the apex.

According to various advantageous embodiments of the invention, the light sources are offset axially relative to the apex.

In a general manner, the advantageous embodiments of each object of the invention are equally applicable to the other objects of the invention. It is envisioned that each object and each advantageous embodiment can be combined.

The invention ensures the production of a conforming component, by limiting or in various instances eliminating any subsequent corrections required. This is, because the invention makes it possible to arrange a fiber ply directly in its correct position since it is placed, in the course of the procedure, exactly where it should be. The invention thus enables the number of checks during production to be reduced. A statistical analysis may be sufficient. By recording the steps of adjustment during draping, the correct positioning of the plies can be confirmed by means of their reference markings. The ply stacking method can be executed manually. It can also be executed automatically, since the installation can comprise an adding arm and/or an arm for moving or adjusting the ply position.

The projection of an illuminated mark offers high control quality, since it is possible to project an illuminated line whose shape matches that of the reference marking, the error being less than 0.10 mm.

The invention proposes a stacking solution which limits errors of positioning and orientation, as well as variations in tension. The fineness of the mesh of reference markings ensures precision and uniformity. The production of a flange requiring a change in direction or a variable diameter is compatible with the quality added by the invention.

The invention allows matching between a plurality of reference markings of different plies, thereby contributing to the uniformity of the composite wall. The strength of the wall is increased and its behaviour is more predictable in both static and dynamic terms.

DRAWINGS

FIG. 8 shows a stack of plies of the preform as shown in FIG. 6 according to various embodiments of the invention.

FIG. 9 shows a ply whose threads are arranged at 0°/90° according to various embodiments of the invention.

FIG. 10 shows a ply whose threads are arranged at 45° according to various embodiments of the invention.

DETAILED DESCRIPTION

In the following description, the terms "interior" or "internal" and "exterior" or "external" refer to positioning relative to the axis of rotation of an axial turbine engine. The axial direction corresponds to the direction along the axis of rotation of the turbine engine.

Figure 1:
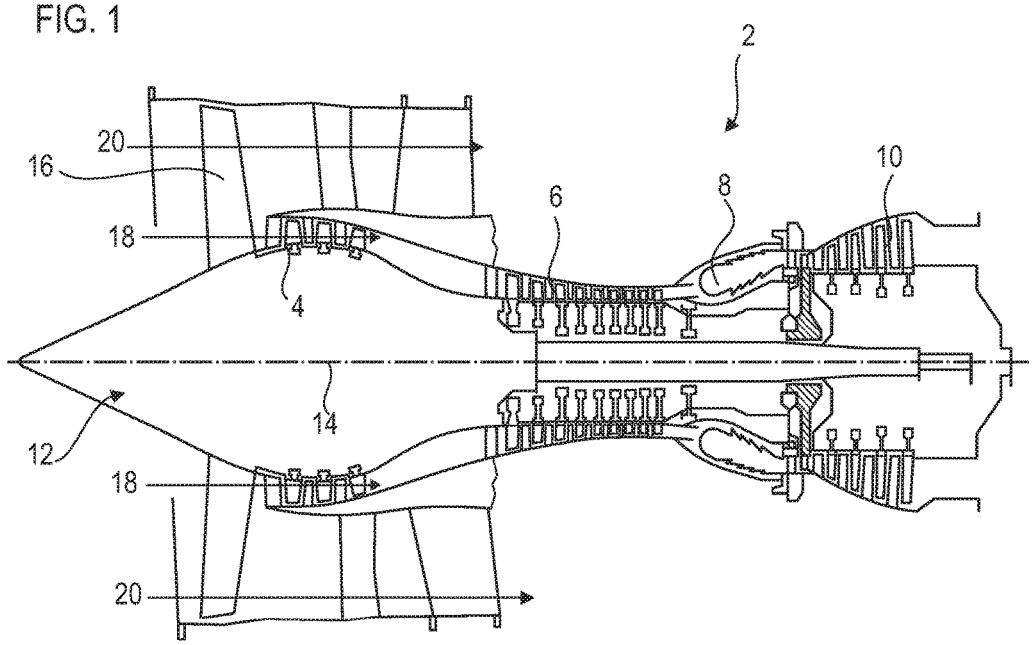
FIG. 1 shows an axial turbine engine, according to various embodiments of the invention.

FIG. 1 shows an axial turbine engine in a simplified manner. In this particular case, the engine is a double-flow turbojet. The turbojet 2 comprises a first compression stage called the low-pressure compressor 4, a second compression stage called the high-pressure compressor 6, a combustion chamber 8 and one or more turbine stages 10. In operation, the mechanical power of the turbine 10 transmitted via the central shaft to the rotor 12 causes the two compressors 4 and 6 to move. These compressors have a plurality of rows of rotor blades associated with rows of stator blades. The rotation of the rotor 12 about its axis of rotation 14 can thus generate an air flow and progressively compress this air flow up to the intake of the combustion chamber 8.

An intake fan, commonly referred to as a fan or blower 16, is coupled to the rotor 12 and generates an air flow divided into a primary flow 18, which passes through the aforementioned different stages of the turbine engine, and a secondary flow 20, which passes through an annular duct (partially shown) along the machine and then rejoins the primary flow leaving the turbine. The secondary flow 20 can be accelerated so as to generate a thrust reaction. The primary flow 18 and the secondary flow 20 are annular flows and are channelled by the casing of the turbine engine. For this purpose, the casing has cylindrical walls or shrouds which can be internal and external.

Figure 2:
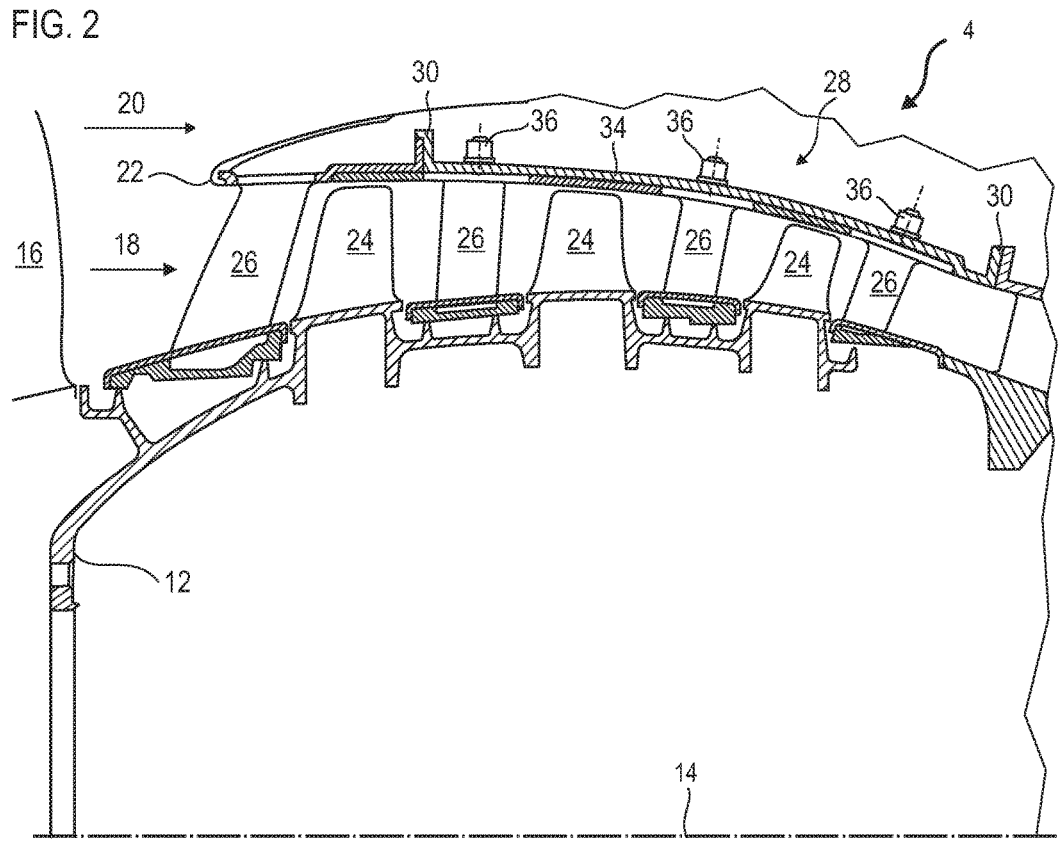
FIG. 2 is a diagram of a turbine engine compressor according to various embodiments of the invention.

FIG. 2 is a sectional view of a compressor of an axial turbine engine such as that of FIG. 1. The compressor can be a low-pressure compressor 4. A part of the fan 16 is shown, together with the flow separator 22 for separating the primary flow 18 from the secondary flow 20. The rotor 12 can comprise a plurality of rows of rotor blades 24, numbering three in the present case.

The low-pressure compressor 4 can comprise at least one rectifier, e.g., a plurality of rectifiers, numbering four in the present case, each of which contains an annular row of stator blades 26. Each rectifier is associated with the fan 16 or with a row of rotor blades 24 to rectify the air flow from these components, so as to convert the speed of the flow into pressure.

The compressor comprises at least one casing 28. The casing 28 can have a generally circular or tubular shape. It can be an external compressor casing and can be made of composite materials, which enables its weight to be reduced while optimizing its rigidity. The casing 28 can comprise fastening flanges 30, for example annular fastening flanges 30 for fastening the flow separator 22 and/or for fastening the flange to an intermediate fan casing of the turbine engine.

The composite casing 28 can comprise a wall 34 that is generally circular or in the form of an arc of a circle, the edges of which can be delimited by the flanges 30. The wall 34 can have a profile of revolution about the axis of rotation 14. The wall 34 can be ogival in shape, with a variation of radius along the axis 14. This variation of the radius can be inverted, with the minimum diameter downstream. The wall 34 has an interior surface with a double curve. The axial length of the wall 34 can represent most of the minimum radius of the interior surface of the wall, and in various instances its axial length can be greater than or equal to the minimum radius of the interior surface of the wall 34. The axial length is measured along the axis of rotation 14.

The composite casing 28, or at least its wall 34, can be made by injection moulding. The injection can consist in impregnating a fibrous reinforcement with a resin, for example an organic resin such as epoxy. The impregnation can be performed by a method of the RTM (Resin Transfer Moulding) type. The wall 34 can comprise a composite material, with an organic matrix and a reinforcement, in various instances a fibrous reinforcement, such as a fiber preform.

Since the wall 34 can have a curved shape, the preform also reproduces this curved shape; the aspects described above. The preform can also reproduce the axial and annular flanges. It can conform to the symmetry of revolution with a profile of revolution about the axis 14. The preform can comprise a stack or a winding of different fibrous sheets or fiber plies, which can extend over the wall, and over at least one or more flanges.

The stator blades 26 extend essentially radially from the wall 34. The stator blades 26 can comprise platforms, in various instances equipped with fastening shafts 36 such as lock bolts, threaded rods or any other equivalent means. These fastening shafts 36 pass through the wall 34, and in particular through its preform. The irregularity of the forces transferred from the shafts 36 to the preform promotes the appearance of composite, complex deformation modes.

Figure 3:
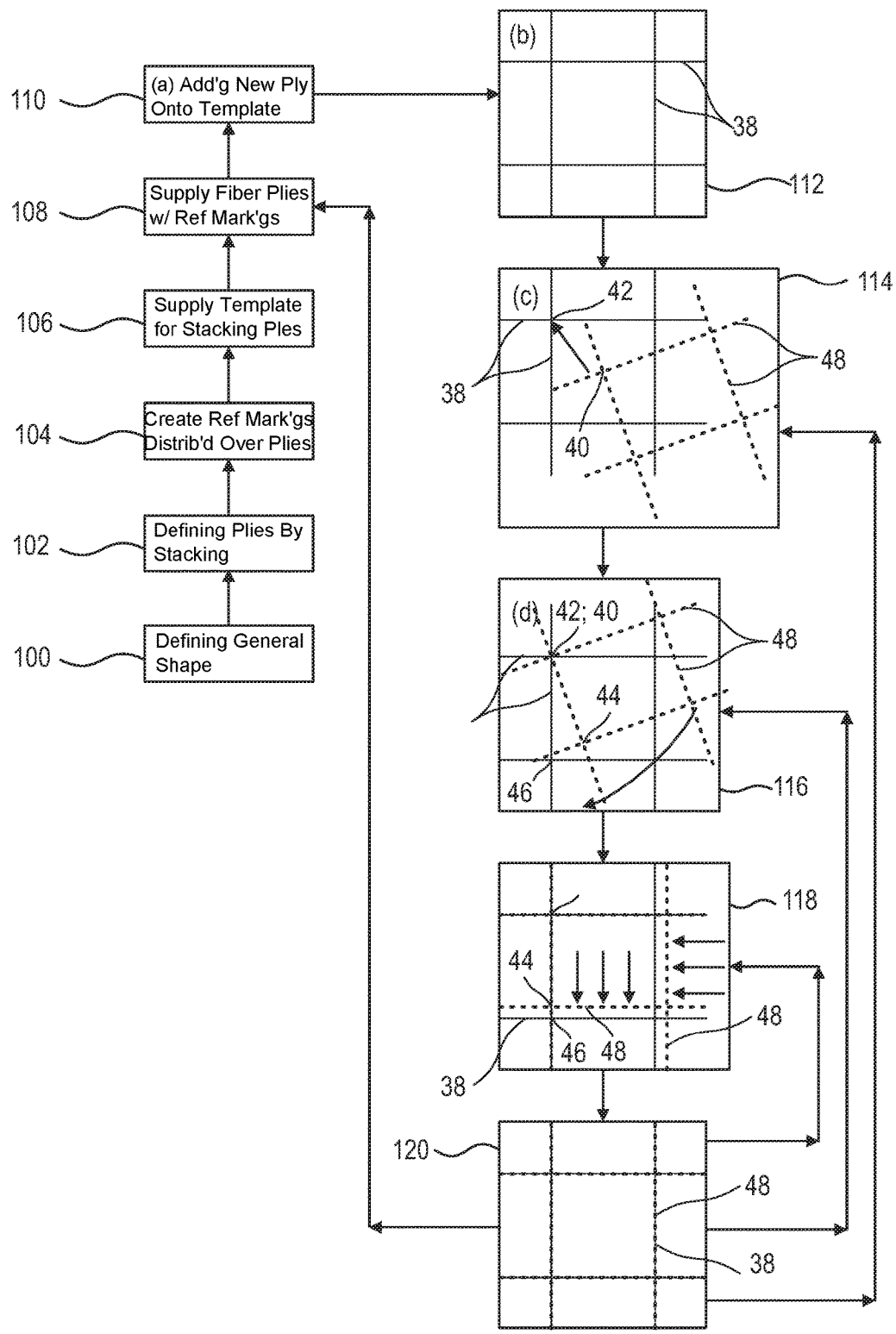
FIG. 3 shows a diagram of the method for stacking fiber plies according to various embodiments of the invention.

FIG. 3 shows a diagram of the method for stacking fiber plies for producing the reinforcing preform of the composite wall, for example such as that shown in FIG. 2 in relation to the compressor casing 28. The method can be an iterative method, which repeats some or all of its steps.

The method can comprise the linking of the following steps, which, in various instances, can be (but not necessarily) executed in the following order:
  defining a general shape 100 of a preform corresponding to the composite wall 34; this definition can precede compaction, for example compaction in an injection mould;
  defining the plies 102 forming the preform by stacking;
  creating 104 predefined reference markings 48 distributed over the plies, and defining positions in space which the reference markings of the plies must occupy when the preform is shaped;
  supplying or providing 106 a template for stacking the plies, the template having a ply receiving surface corresponding to a surface of the preform, and/or of the wall;

supplying or fabricating 108 fiber plies with reference markings 48 which are precursors of those which have been predefined;

(a) adding 110 or introducing a new ply onto the template, or onto a preceding ply of the stack;

(b) projecting 112 illuminated marks 38 onto the template or onto the new added ply, the marks 38 indicating the positions to be occupied by the reference markings 48 in order to ensure that the ply has its predefined configuration;

(c) moving 114 a first reference marking 40 of the added ply so that it coincides with the first mark 42 associated with it;

(d) adjusting the position of the added ply so that a second reference marking 44 coincides with a second mark 46, the adjustment comprising:

rotating 116 a portion of the added ply, in various instances the rotation enabling the second reference marking 44 to be brought onto an illuminated mark line 38; and/or deforming 118 the added ply by elongation or retraction, in various instances the deformation being carried out along two axes, and in various instances the order of deformation and rotation being reversed; these last-mentioned operations can be performed a number of times;

validating 120, optionally, an assembly in which all the reference markings coincide.

The method can then proceed by placing a third reference marking in correspondence with a third mark so that they coincide, then repeating this procedure with a fourth reference marking and a fourth mark, then with an N-th reference marking and an N-th mark, and so on. The adjustment can cause a number of other reference markings to coincide simultaneously.

The method can perform these actions on an area with a set of reference markings 48, in various instances the order of approach can be based on the order of proximity to the first reference marking 40. This enables the operation to take place progressively, avoiding deformation of parts which are already correctly positioned. The method can then correct the positions of a number of other reference markings by moving them one by one, progressively, or together.

Illuminated marks 38 change with each type of ply so as to project dedicated indications onto the plies. The reference markings 48, as well as the corresponding illuminated marks 38, can be considered to be points, lines, points at the intersections of lines, or polygons formed by the lines or the apexes of the points. The mechanism of coincidence between the reference markings 48 and the marks 38 described above is based on points. It is also possible to establish coincidences between a reference marking line 48 and an illuminated mark line 38.

In various embodiments, the positions in space of the marks and reference markings are calculated on the basis of an existing ply model with reference markings.

Figure 4:
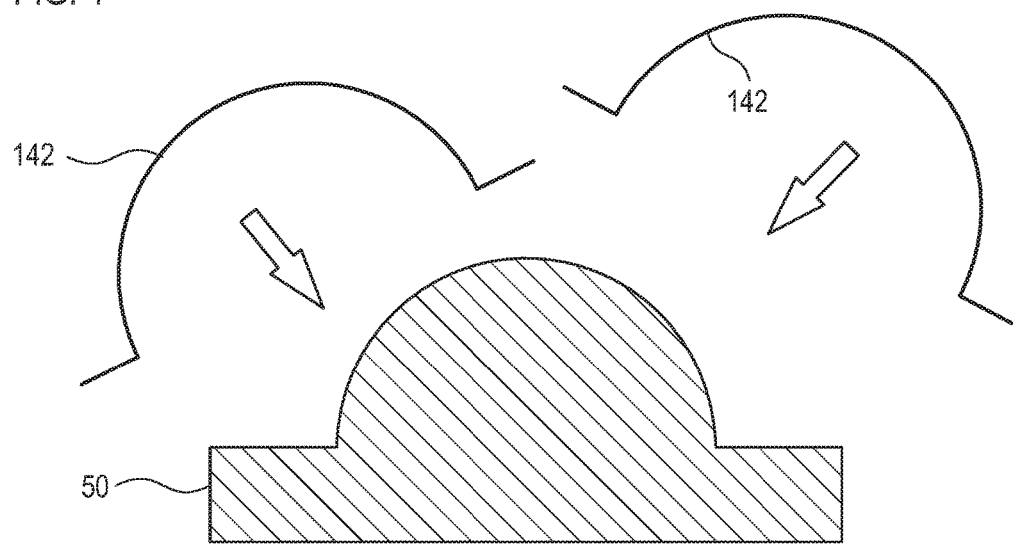
FIG. 4 shows the steps of stacking plies on a template according to various embodiments of the invention.

FIG. 4 shows the operation of stacking fiber plies 142 on a template 50. The template 50 forms a support for the construction and shaping of the plies.

Before stacking, the plies 142 can be woven so that they generally have their final shape. They can be woven in a three-dimensional manner for this purpose. Each of them can have axial flanges, and in various instances radial flanges. Since the casing and its wall can be shaped as a half-shell, each preformed ply 142 can reproduce the half-shell shape. The plies 142 are placed on the template in turn. During this operation, the new ply 142 covers the template 50 or the preceding ply 142. Each ply 142 can be placed in conformity with the stacking method according to various embodiments of the invention.

Figure 5:
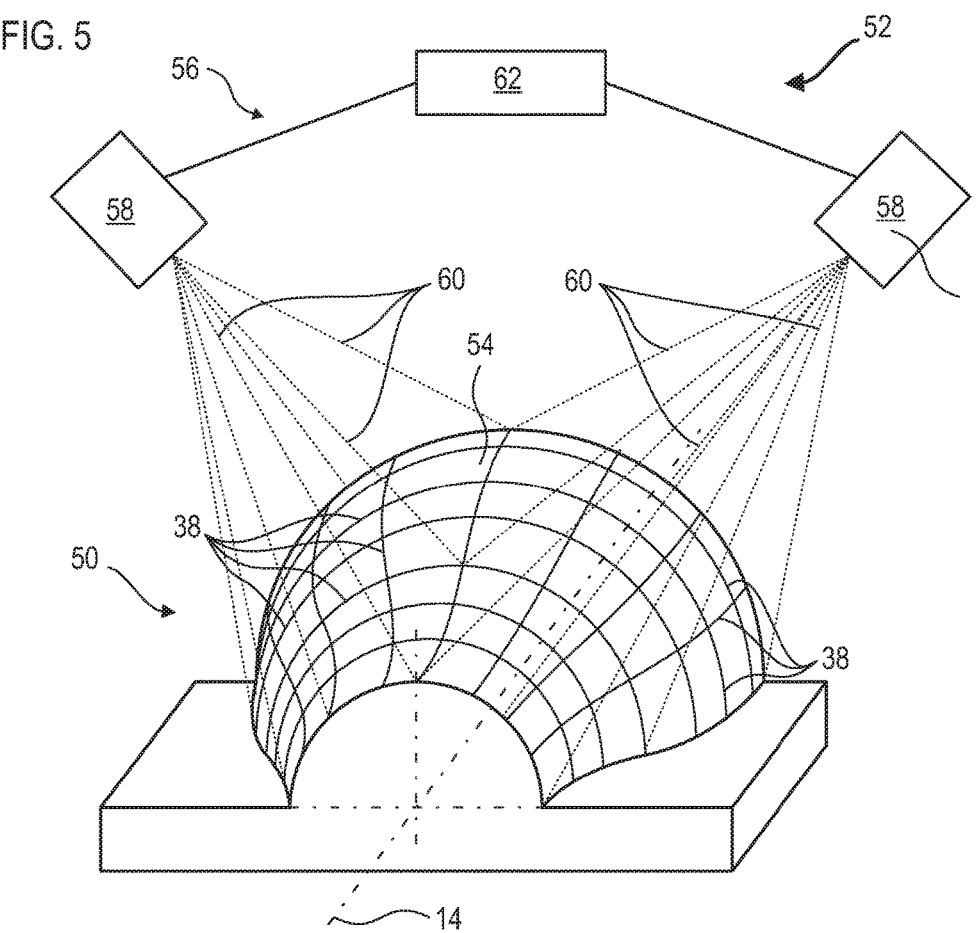
FIG. 5 shows an installation for stacking plies according to various embodiments of the invention.

FIG. 5 shows an installation 52 for stacking fiber plies for producing a fiber preform of a composite wall. The axis 14 is shown to provide an orientation reference.

The template 50 has a surface 54 for receiving the plies, on which the plies are applied, being deformed by sliding above. The stacking surface 54 has a shape matching the surface that one side of the preform is to have. The stacking surface 54 can match a surface of a mould used to form the composite wall.

The installation 52 comprises a light device 56 for projecting the illuminated marks 38, such as destinations for the reference markings of the plies. On each occasion, the illuminated marks 38 are adapted to the new added ply. In the present case, the illuminated marks 38 comprise axial lines and arc-shaped lines. The latter can be parallel, their centers being located on the axis 14 in this case.

The light device 56 can comprise a plurality of light sources 58 such as lasers 58. By choosing two sources 58, it is possible to reach the whole surface of a half-tube, avoiding the appearance of a shadow area. This characteristic makes it possible to bring the sources 58 closer to the template, and to form a more compact installation in spite of the obscuring protrusions of the template 50.

The sources 58 can be movable so that their beams 60 sweep the whole stacking surface 54. A control unit 62 can be used to control the movements of the light sources 58 so that their beams 60, which in various instances can be point beams, describe the set of lines of the ply reference markings. The axial flanges of the template 50 can also be reached. The control unit 62 can be used to make the radiation 60 of each light source 58 coherent, and a test pattern on the template 50 can be used to calibrate the device 56.

Figure 6:
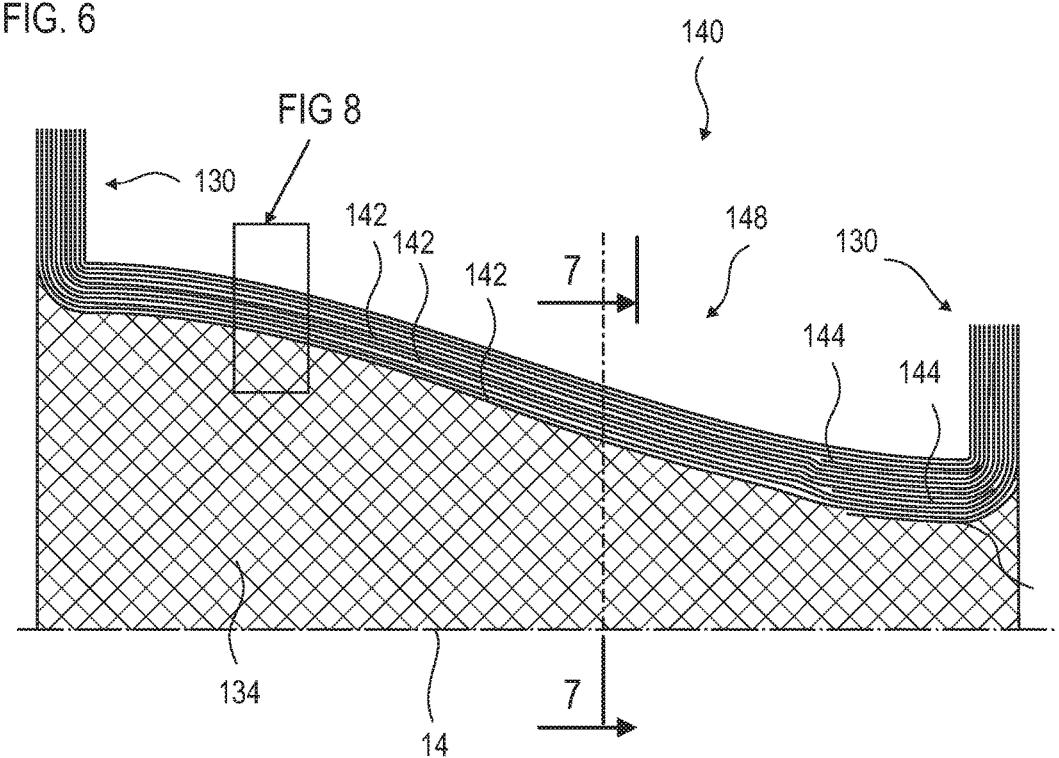
FIG. 6 shows a section through the axial profile of the preform according to various embodiments of the invention.

FIG. 6 shows a section through the preform 140 made by stacking, which is the result of the method of stacking plies 142. The preform 140 can match that of the composite wall of the casing shown in FIG. 2. The section is taken along a line corresponding to the axis of rotation 14 of the turbine engine.

The preform 140 can reproduce a fiber wall 134 which is the precursor of the composite wall. Each ply 142 can extend over an axial fraction of the wall. Thus, the number of plies 142 can vary axially. The number of plies 142 can increase in the downstream direction. The preform 140 can comprise localized plies 144, for example plies provided for an annular flange 130. The preform 140 can reproduce at least one, or in various instances a plurality of annular fiber flanges 130 corresponding to that of the composite casing. At least one fiber ply 142 can link each annular flange 130. In various instances, most or all of the fiber plies 142 of the wall extend into each annular flange 130, in various instances over the whole of its radial height.

At least one, or each, fiber ply 142 is woven in the shape of the wall 142, in various instances including the shapes of flanges 130. Each ply 142 can be preformed and/or deformed before being stacked; in various instances its shape can be adjusted when it is draped in the stack 148. Most of the fiber plies 142 can extend along the whole axial length of the wall 134.

Figure 7:
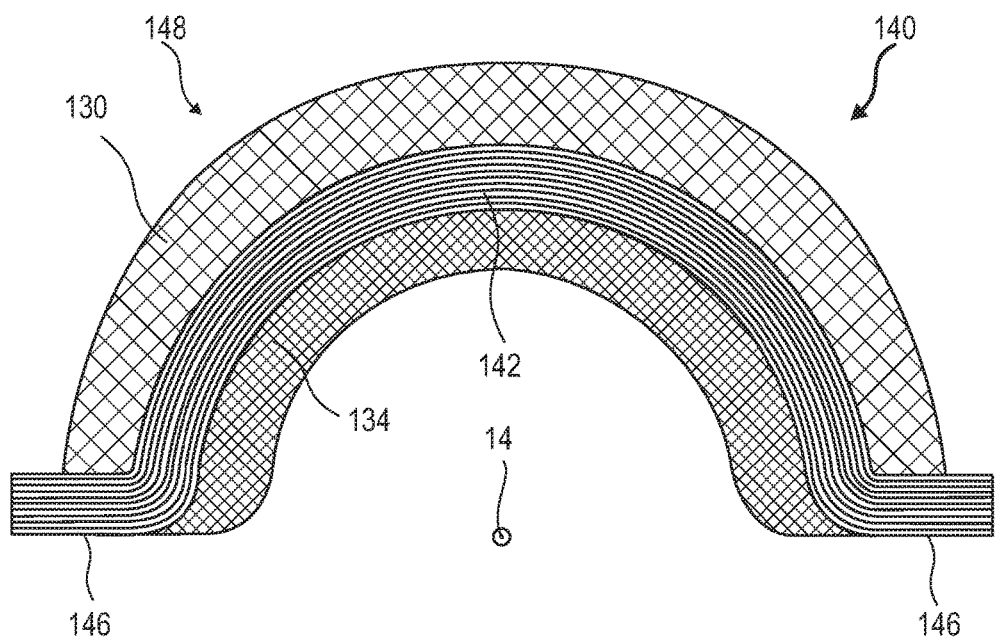
FIG. 7 shows a section through the preform along the axis 7-7 drawn on FIG. 6 according to various embodiments of the invention.

FIG. 7 shows a section through the preform 140 along the axis 7-7 drawn on FIG. 6. The axis 14 is drawn to provide an orientation reference.

The composite casing can describe a circle. It can be formed by two annular half-casings, each of which describes a semicircle. Thus, the annular casing can comprise two preforms 140 forming half-circles. To join the half-casings, these are equipped with axial fastening flanges designed to be fastened to one another. They are reinforced by axial fiber flanges 146 of the preform 140. The axial flanges border the wall portions 134.

As a result of its stacking 148, the preform 140 can comprise at least one ply 142 extending in the wall 134 and in each axial flange 146. Most of the plies 142 or each ply can, in various instances, extend in the fiber wall 134 and in each axial flange 146, for example over the whole surface of each axial flange.

FIG. 8 shows the stack 148 of the fiber plies 142 of the preform. The axis 14 is shown in order to provide an orientation reference for the direction of stacking.

The plies 142 can be woven plies. The stack 148 can comprise non-woven plies, in which case most of the plies of the stack 148 are, in various instances, woven plies. The plies 142 can comprise carbon fibers, and/or graphite fibers, and/or glass fibers.

Most of the plies 142 of the stack 148 can have fibers of the same kind. In various embodiments, the fibers of the stack 148 are fibers of the same kind, for example carbon fibers. The stack 148 can be a main stack. The stack can be covered with plies whose fibers are made of another material, such as glass fibers to prevent the galvanic corrosion of the composite casing.

The stack 148 can comprise 8 to 30 woven plies 142, in various instances using fibers of the same kind; for example from 10 to 20 woven plies 142, on various instances using fibers of the same kind; for example, from 12 to 16 woven plies 142, in various instances using fibers of the same kind.

Over most of the surface of the wall, the stack 148 can have a symmetry according to the thickness of the type of plies 142 and the orientation of the fibers.

FIG. 9 shows a fiber ply 142 of the stack 148. The axis 14 is shown to provide a reference marking for the orientation of the fibers. The ply 142 is shown in developed form, in plan.

The woven ply 142 shown here comprises woven fiber threads 150. The threads 150 form two sets of perpendicular threads. The threads 150 of one set are parallel to the axis 14, while the threads 150 of the other set are perpendicular to the same axis 14. Each thread 150 of fibers has a plurality of fibers according to its section, for example six thousand fibers (6 k), twelve thousand fibers (12 k), or more. Each thread can be twisted or braided.

The woven ply 142 can be woven using warp threads and weft threads. The weft threads can generally be arranged along the axis of rotation 14 of the turbine engine, and can comprise the axial fibers, and the warp threads can be generally arranged along the circumference of the wall and can comprise the circumferential threads.

Additionally, the ply 142 comprises tracer threads 48 forming reference markings 48. The tracer threads 48 can have a different color from the other threads 150, called the majority threads 150. The latter can be made of carbon and therefore be colored black; in this case, the tracer threads are white to promote the contrast. These tracer threads 48 can be parallel to the majority threads 150 in order to reproduce their orientation. They can be interlaced with or added to the majority threads 150, or can replace them.

The tracer threads 48 are arranged in two sets of perpendicular threads, and are orientated at 0° relative to the axis 14, or at 90°. They are axial or follow the circumference. They form an interlacing pattern, and in various instances a grid pattern. This interlacing is exactly the image projected onto the template by the light device, the projected image being adapted to the particular geometry of the template.

FIG. 10 shows a fiber ply 142 of the stack 140. The axis 14 is shown to provide an orientation reference. The ply 142 is shown in developed form, in plan.

The ply 142 also has majority threads 150 woven in two perpendicular directions. The threads 142 are generally orientated at −45° or at +45° relative to the axis 14, and/or relative to the circumference of the composite casing. Additionally, the ply 142 has perpendicular tracer threads 48 incorporated into the ply 142. When the ply 142 occupies its position in the preform, its tracer threads 48 describe helices or helicoids, in various instances with variable pitches and/or variable radii. When the light device projects the illuminated marks, it projects a grid pattern. The lines of the grid pattern follow helices or spirals in space.

The stack described above comprises threads arranged in two directions, but in various instances it can have three threads, orientated for example at −30°/90°/+30° to the axis 14. The stack of FIG. 8 can have any distribution of plies such as those described in relation to FIGS. 9 and 10, or plies having three thread directions.

The invention has been described in relation to an engine casing, but it can equally be applied to an aircraft fuselage, to a fan casing, or to structures. The invention can also offer solutions for parts of a vehicle's bodywork such as a shell or a composite roof of a vehicle.

The invention claimed is:

1. An iterative method of stacking fiber plies for producing a reinforcing preform of a composite wall, said method comprising:
   adding a fiber ply onto one of a preceding ply or a stacking template, the added fiber ply having reference markings distributed over a surface thereof, the reference markings including at least a first reference marking and a second reference marking;
   projecting at least two illuminated marks onto the added ply, the illuminated marks including a first illuminated mark and a second illuminated mark, the illuminated marks being adapted to trace on the added ply the predetermined positions that the corresponding first and second reference markings are to occupy in the preform;
   moving the added ply relative to the illuminated marks so that the first reference marking coincides with the first corresponding mark; and
   adjusting the added ply so that the second reference marking coincides with the second corresponding mark;
   repeating the adding, projecting, moving and adjusting so as to form a stack of fiber plies forming the preform.

2. The iterative method of claim 1, wherein adjusting the added ply comprises a deformation of the added ply so that the second reference marking coincides with the second mark.

3. The iterative method of claim 1, wherein adjusting the added ply comprises a rotation of at least a portion of the added ply around the first illuminated mark.

4. The iterative method of claim 1, wherein subsequent to moving the added ply, the method further comprises positioning of a wedge for locking the added ply, the wedge being applied against the first reference marking.

5. The iterative method of claim 1, wherein:
   projecting the at least two illuminated marks comprises projecting at least N illuminated marks onto the added ply, the ply comprising at least N corresponding reference markings; and adjusting the added ply comprises moving of a set of reference markings so that they coincide with their corresponding illuminated marks, the coincidence being established in a progressive way, by proximity order with respect to the first reference marking.

6. The iterative method of claim 1, wherein at least one fiber ply is a ply woven with woven fibrous threads, in two generally perpendicular directions, and during adding the fiber ply and adjusting the added ply, the inclination of the woven threads varies, and one or more of the reference markings move one of towards or away from one another.

7. The iterative method of claim 1, wherein the reference markings comprise polygons and the illuminated marks form corresponding polygons.

8. The iterative method of claim 1, wherein the reference markings form a grid pattern, the illuminated marks being configured to reproduce the grid pattern.

9. The iterative method of claim 1, wherein the reference markings comprise semicircles which are concentric, and the preform comprises a central axis, the first reference marking being located on the central axis.

10. The iterative method of claim 1, wherein when adding a fiber ply, the added ply is positioned so as to be generally centred with respect to one of the template or with respect to the preceding ply.

11. The iterative method of claim 1, wherein the preform has a main surface with an apex, the first reference marking being located on the apex.

12. The iterative method of claim 1, wherein the preform forms one of a tube or an angular portion of a tube, and the preform comprises plies woven with perpendicular threads, and the woven plies comprise threads arranged at 0° and 90° to the axis of the tube and threads arranged at −45° and +45° to the axis of the tube.

* * * * *